United States Patent
Arulandu et al.

(10) Patent No.: US 9,872,348 B2
(45) Date of Patent: Jan. 16, 2018

(54) EFFICIENT LIGHTING CIRCUIT FOR LED ASSEMBLIES

(71) Applicant: PHILIPS LIGHTING HOLDING B.V., Eindhoven (NL)

(72) Inventors: Kumar Arulandu, Eindhoven (NL); Johan-Paul Marie Gerard Linnartz, Eindhoven (NL); Eugen Jacob De Mol, Eindhoven (NL); Dmytro Viktorovych Malyna, Eindhoven (NL); Henricus Marius Joseph Maria Kahlman, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/161,328

(22) Filed: May 23, 2016

(65) Prior Publication Data
US 2016/0353535 A1 Dec. 1, 2016

(30) Foreign Application Priority Data

May 28, 2015 (EP) .................................... 15169530

(51) Int. Cl.
H05B 33/08 (2006.01)

(52) U.S. Cl.
CPC ....... H05B 33/0815 (2013.01); H05B 33/083 (2013.01); Y02B 20/346 (2013.01)

(58) Field of Classification Search
CPC ............ H05B 33/0815; H05B 33/0818; H05B 33/0884; H05B 33/0809; H05B 33/0848; H05B 33/0896; H05B 33/0803; H05B 37/0272; H05B 33/0857; H05B 33/0887

USPC .......................... 315/294, 291, 201, 307, 224
See application file for complete search history.

(56) References Cited

U.S. PATENT DOCUMENTS

| | | | |
|---|---|---|---|
| 7,535,183 B2 | 5/2009 | Gurr | |
| 8,373,346 B2 | 2/2013 | Hoogzaad et al. | |
| 8,604,699 B2 * | 12/2013 | Kotowski | H05B 33/0818 315/122 |
| 8,729,809 B2 * | 5/2014 | Kit | H05B 33/0809 315/185 R |
| 9,018,851 B1 * | 4/2015 | Melanson | H05B 33/0815 315/185 S |
| 2008/0018261 A1 * | 1/2008 | Kastner | F21V 23/00 315/192 |
| 2012/0080944 A1 * | 4/2012 | Recker | H02J 9/02 307/25 |

(Continued)

FOREIGN PATENT DOCUMENTS

| | | |
|---|---|---|
| DE | 10210040266 A1 | 9/2011 |
| WO | WO2008068705 A1 | 6/2008 |

(Continued)

*Primary Examiner* — Douglas W Owens
*Assistant Examiner* — Syed M Kaiser
(74) *Attorney, Agent, or Firm* — Akarsh P. Belagodu (57) ABSTRACT

A lighting circuit and a method of operating a lighting circuit are described. A rectifier 14 has an input for an alternating voltage V. At least a first and a second LED assembly 20, 22 are connected to be supplied with electrical power from the rectifier 14. The first LED assembly 20 is electrically connected to a first output 26 of the rectifier 14 and electrically connected in series with an input 36 of a switching converter circuit. The second LED assembly 22 is electrically connected to an output 48 of the switching converter circuit 44. A control assembly 30 is connected to a tap 46 in the series connection for controlling operation of the first LED assembly 20.

11 Claims, 6 Drawing Sheets

(56) References Cited

U.S. PATENT DOCUMENTS

| | | | | |
|---|---|---|---|---|
| 2012/0081009 A1* | 4/2012 | Shteynberg | .......... | H05B 33/083 315/122 |
| 2012/0139442 A1* | 6/2012 | Soleno | ............... | H05B 33/0815 315/294 |
| 2012/0256550 A1* | 10/2012 | Akiyama | ........... | H05B 33/0824 315/187 |
| 2013/0002156 A1* | 1/2013 | Melanson | .......... | H05B 33/0815 315/186 |
| 2014/0139125 A1 | 5/2014 | Lee | | |
| 2014/0217907 A1* | 8/2014 | Harris | ................ | H05B 33/0815 315/186 |
| 2014/0265935 A1* | 9/2014 | Sadwick | ............ | H05B 33/0815 315/307 |
| 2014/0361623 A1* | 12/2014 | Siessegger | ......... | H05B 33/0803 307/64 |
| 2015/0084544 A1* | 3/2015 | Mitterbacher | ..... | H05B 33/0818 315/294 |
| 2015/0223303 A1* | 8/2015 | Hsia | .................. | H05B 33/0884 315/121 |
| 2015/0230302 A1* | 8/2015 | Ito | ...................... | H05B 33/0815 315/77 |
| 2016/0057825 A1* | 2/2016 | Hu | .................... | H05B 33/0815 315/201 |

FOREIGN PATENT DOCUMENTS

| | | |
|---|---|---|
| WO | WO2010027254 A1 | 3/2010 |
| WO | WO2011053708 A1 | 5/2011 |
| WO | WO2012131592 A1 | 10/2012 |
| WO | WO2014072847 A1 | 5/2014 |

* cited by examiner

EFFICIENT LIGHTING CIRCUIT FOR LED ASSEMBLIES

FIELD OF THE INVENTION

The invention relates to a lighting circuit and a method of operating a lighting circuit. In particular, the invention relates to lighting circuits including at least a first and second LED assembly connected to be supplied with electrical power from a rectifier with an input for an alternating voltage.

BACKGROUND OF THE INVENTION

A known type of driver circuit for LEDs is a tapped linear driver. In a tapped linear driver (TLD) structure, LEDs are typically arranged in series and supplied with a varying operating voltage, such as a rectified mains voltage. Control assemblies, such as switches or current sources are connected to the taps, i.e. the interconnection points in the series connection. By suitable control, groups of the LED elements are operated depending on the momentarily available supply voltage.

WO 2010/027254 A1 describes an LED assembly comprising a serial connection of two or more LED units, each LED unit comprising one or more LEDs. Each LED unit is provided with a controllable switch for short-circuiting the LED unit. A converter, which may be a buck converter or boost converter, provides power to the LED units by converting an input power source to an appropriate current source for the LEDs. A control unit receives a signal representing a voltage level of the supply voltage and controls the switches in accordance with the signal.

SUMMARY OF THE INVENTION

It may be considered an object to provide a simple and inexpensive lighting circuit with good efficiency under different operating conditions.

This object is achieved by a lighting circuit according to claim 1 and an operating method according to claim 13. Dependent claims refer to preferred embodiments of the invention.

According to the invention, electrical power is supplied to LED assemblies from a rectifier with an input for an alternating voltage, in particular a mains voltage. The rectifier may be of any type, such as e.g. a half bridge, but a full bridge rectifier is preferred. Thus, preferably the voltage supplied at the output of the rectifier will be a rectified sinusoidal voltage.

In the present context, the term "LED assembly" shall designate either a single LED element (which may be of any type of solid state lighting element, including light emitting diodes, OLEDs, etc) or a circuit comprising multiple such LED elements, e.g. electrically connected in series, in parallel, or in any series/parallel configuration. Preferably, each LED assembly comprises only two terminals, generally an anode and a cathode terminal. If the LED assembly comprises multiple LED elements, these are preferably only jointly and not separately operable, such as e.g. in an electrical series connection. While simple embodiments of the invention may comprise only a first and second LED assembly, it will be generally preferred to provide more than two separately operable LED assemblies, such as e.g. three, four or more.

According to the invention, the first LED assembly is electrically connected to a first output of the rectifier, in particular in a series connection, and further in series with an input of a switching converter circuit. This term "in series" refers to the general structure of the circuit, such that the first LED assembly may be directly or indirectly connected either to the output of the rectifier or to the switching converter circuit, or both, i.e. further circuits or components may be arranged in between. In some embodiments, the first LED assembly may be directly electrically connected to either the output of the rectifier, or to the input of the switching converter circuit, or to both. Preferably, the series connection is such that a current through the first LED assembly may at least in an active operation states thereof substantially be equal to the current flowing into the input of the switching converter circuit.

The switching converter circuit comprises at least an input and output and serves to convert an input voltage supplied at the input to an output voltage delivered at the output by a switching operation. The switching converter may be of any known type, such as e.g. a buck converter, boost converter, buck-boost converter, SEPIC, etc. Generally preferred, the switching converter circuit comprises at least one reactive element, such as a capacitor, but preferably an inductor, which can store energy. The switching converter circuit further preferably comprises at least one controllable switching element, such as e.g. a transistor, MOSFET, relay or other known electronic switching element, and a control circuit for controlling the controllable switching element. The control circuit may control the controllable switching element to repeatedly alternate between a conducting and a non-conducting state, which is in the present context understood such that the resistance in the non-conducting state is significantly, at least one order of magnitude higher than in the conducting state. By the controlled switching operation, an electrical parameter of the energy stored in the reactive element, such as e.g. the voltage of a capacitor and/or current through a conductor may be altered, such that by continuously alternating switching operation a controlled output voltage may be derived from the input voltage. The magnitude of the output voltage may be controlled by altering the timing of the switching operation. Depending on the topology of the switching converter circuit, the output voltage may e.g. be lower than the input voltage (as e.g. in a buck converter), or may be higher than the input voltage (as e.g. in a boost converter), or may, depending on the mode of operation, either be higher or lower than the input voltage (as e.g. in a buck-boost converter).

According to the invention, a second LED assembly is electrically connected to an output of the switching converter circuit. The second LED assembly may thus be supplied with electrical power from the switching converter circuit. A switching converter circuit generally has a high efficiency, since an excess voltage or power is not dissipated, as in linear drivers, but the available voltage and/or power is converted into values suited for operation of the second LED assembly. As will become apparent in connection with preferred embodiments, the second LED assembly may be connected to be exclusively powered by the switching converter circuit, or alternatively, the second LED assembly may be connected to also be supplied with electrical power from a series connection of the first output of the rectifier and the first LED assembly.

Further, a control assembly is provided and connected at least to a tap in the series connection between the first LED assembly and the input of the switching converter circuit, for controlling operation of the first LED assembly. The term "control assembly" here may refer to any element or circuit suited to control operation of the first LED assembly, in particular preferred to control the current through the LED assembly. As will become apparent in connection with preferred embodiments, possible types of control assemblies may be e.g. a controllable bypass circuit, e.g. including a switching element, allowing to controllably bypass the first LED assembly, or a controlled current source.

The control assembly is connected to a tap in the series connection. The proposed structure of the circuit according to the invention may thus correspond to the known topology of a tapped linear driver (TLD), with the addition of the input of the switching converter circuit provided in the series connection. Accordingly, a control unit is preferred to control the control assembly, preferably depending on the momentarily available magnitude of the rectified voltage. In particular, the control unit may control the control assembly to activate the first LED assembly if a certain threshold level of the rectified voltage is available, or if a certain current threshold level has been reached. For example, a voltage threshold level may correspond to or be chosen above the forward voltage of the first LED assembly.

The present inventors have recognized that in known TLD circuits using linear regulators, significant losses may occur, in particular for higher input voltages. In the case of known linear control of the current and/or voltage, any voltage mismatch (i.e. difference between a momentarily available voltage and a voltage drop over the LED assemblies) will lead to increased power being dissipated in the driver circuit. Through the use of a switching converter circuit, power may be more efficiently used, in particular in case of a voltage mismatch.

The lighting circuit and method according to the invention may also address another issue in known TLD structures, namely strongly differing operating times for the LED assemblies. In known TLD architectures, some LED assemblies are only activated at relatively high levels of the input voltage. In the case of a sinusoidally varying input voltage, the duration of activation of these LED assemblies is thus significantly below the activation duration for the other LED assemblies in the circuit. Since according to the invention the switching converter circuit may provide electrical power to the second LED assembly, it is possible, as will be apparent from preferred embodiments, to increase the duration of activation thereof within each half cycle of the alternative supply voltage. This may lead to a better distribution of the generated light and improved utilization of the available LED assemblies.

The lighting circuit and method proposed according to the invention also provide significant advantages over the use of a switching converter alone to provide operating power to LEDs. Preferably, electrical power from the output of the switching converter circuit is provided to the second LED assembly, but not to the first LED assembly. Thus, the layout and dimensioning of the switching converter circuit need only be provided for the operating power of the second LED assembly. Thus, a simpler and less expensive switching converter circuit may be used than would be required for providing electrical power to both the first and second LED assembly.

According to a preferred embodiment of the invention, the control assembly, which is connected to the tap in the series connection, may comprise a switching element controllable at least in a conducting and non-conducting state. The switching element may be connected to bypass the first LED assembly in the conducting state. In the non-conducting state, the current flowing in the series connection will thus pass through the first LED assembly.

Alternatively, the control assembly may comprise a controllable current source circuit, which may be connected between the tap and a return path to a second output of the rectifier. Preferably, a sense resistor may provide a current feedback signal to the controllable current source. The sense resistor may be provided in the return path.

As stated above, it may be preferred to provide further individually operable LED assemblies in addition to the first and second LED assembly. For example, a third LED assembly may be provided electrically connected in the series connection between the output of the rectifier and the input of the switching converter. In particular, one or more further LED assemblies may be connected in series to the first LED assembly, e.g. connected directly or indirectly between the first output of the rectifier and the first LED assembly, or between the first LED assembly and the input of the switching converter. The third LED assembly may be provided to form a TLD configuration together with at least the first LED assembly, for example with a control assembly (e.g. either a controllable current source or a bypass circuit) for controlling operation of the third LED assembly being connected to a tap in the series connection to control operation of the third LED assembly. In this way, the overall circuit configuration may correspond to a multi-stage-TLD with the addition of the switching converter provided in the series connection. In the case of further LED assemblies, such as e.g. a third LED assembly, the control unit is preferred to control the control assemblies associated with the LED assemblies such that the LED assemblies are activated in multiple stages, depending on the momentarily available rectified voltage. For example, in a first stage with low rectified voltage below a first threshold, the control assemblies may be controlled such that none of the LED assemblies are activated. As the first threshold level is reached, e.g. the first LED assembly may be activated by correspondingly controlling the associated control assembly. As a second threshold level is reached, the first LED assembly and at least one further LED assembly may be activated, and so on.

In one preferred embodiment of the invention, a capacitor may be connected to the switching converter circuit. Preferably, the switching converter circuit comprises at least two input terminals, and the capacitor may be connected between these two terminals. In particular, the capacitor may be electrically connected in series at least to the first and/or to the second LED assembly. For example, the capacitor may be connected to a tap in the series connection between the first LED assembly and the input of the switching converter circuit on one side and the return path to the second output of a rectifier on the other side. The capacitor may then serve to stabilize an input voltage for the switching converter circuit. If the capacitor is electrically connected directly or indirectly in series with at least the first and/or the second LED assembly and the return path, the voltage across the capacitor will be equal to the momentarily available input voltage minus the voltage drop over the first LED assembly and possible further LED assemblies in the series connection (and minus the additional voltage drop over the rectifier, current sources and other possible components in the electrical path).

Depending on the operation of the circuit, in particular the controllable components thereof such as the control assembly and the switching converter circuit, the voltage over the capacitor may be differently controlled. If the circuit is operated such that a residual voltage over the capacitor remains substantially constant, such that the capacitor remains charged to this substantially constant voltage over a number of half cycles of the mains voltage (i.e. such that the voltage fluctuation during a half cycle is substantially less than the total voltage), it may be referred to as a residual voltage capacitor. In order to effect control of the circuit to achieve this mode of operation, it may be preferred to provide a controllable current source in parallel to the residual voltage capacitor. Alternatively, a controllable current source may be provided in series with the residual voltage capacitor which may deliver a feedback signal of the current to allow the switching converter to maintain a stable average voltage level over the residual voltage capacitor.

The converter circuit may operate using the voltage across the capacitor as input to provide electrical power to the second LED assembly, which significantly improves efficiency as opposed to dissipating the voltage e.g. in a linear regulator.

In further preferred embodiments, at least one stabilizing capacitor may be connected in parallel with at least one of the LED assemblies. The stabilizing capacitor may serve to stabilize the voltage over the LED assembly to achieve a more stable light output. A stabilizing capacitor may be connected in parallel e.g. at least to the first LED assembly as well as to all further LED assemblies.

In a particularly preferred embodiment of the invention, the second LED assembly may be electrically connected in series with the first LED assembly. Thus, the electrical power provided from the output of the switching converter may be provided to at least one LED assembly of the series connection. Blocking diodes may be provided in a feedback path from the output of the switching converter circuit and/or in the series connection of LED assemblies to prevent a reverse current flow. The second LED assembly may e.g. be electrically connected directly or indirectly between the first LED assembly and the input of the switching converter circuit. In a particularly preferred circuit, the second LED assembly may thus be connected between an input and an output of the switching converter circuit. In this configuration, especially a boost or buck-boost type of switching converter circuit is preferred, which is able to deliver a higher output voltage than input voltage.

In further preferred embodiments, a current source may be provided which is electrically connected in series at least to the first LED assembly. The current source may further be provided in series with further LED assemblies, and/or with the second LED assembly. The current source may serve to regulate the current through the series connection as known from conventional TLD configurations.

These and other aspects of the invention will be apparent from and elucidated with reference to the embodiments described hereinafter.

DETAILED DESCRIPTION OF EMBODIMENTS

Figure 12:
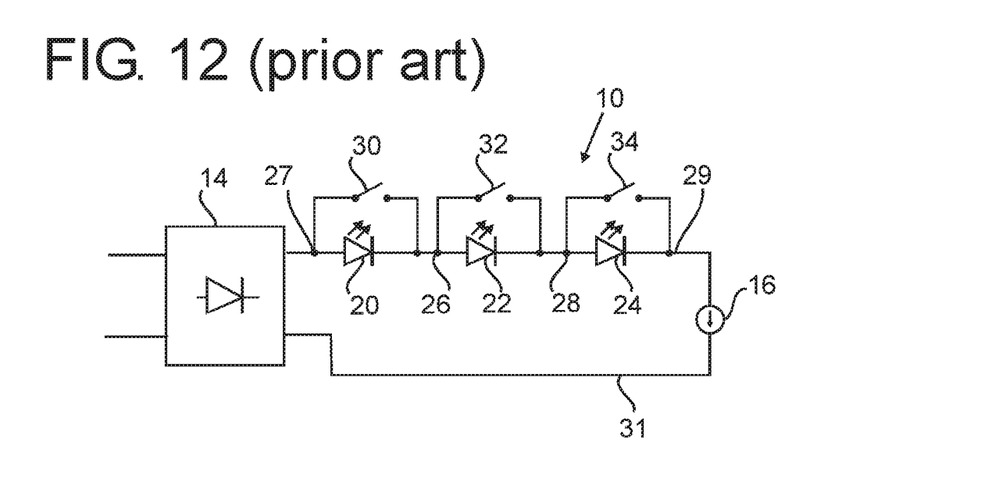
FIGS. 12, 13 show circuit diagrams of prior art circuits.
Figure 13:
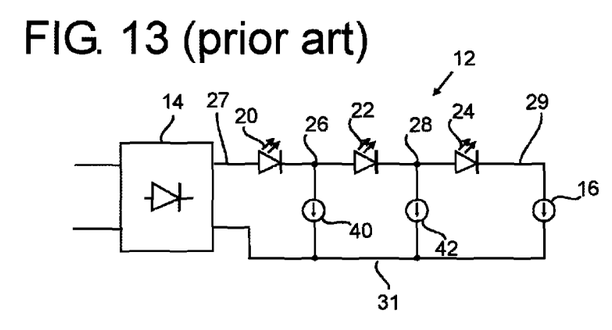

FIGS. 12 and 13 show driver circuits 10 and 12 generally known for driving multiple LED assemblies, in the shown example three LED assemblies 20, 22, 24 from the output of a rectifier 14 that is powered by mains voltage.

In the circuits 10, 12, the LED assemblies 20, 22, 24 are arranged in the configuration of a tapped linear driver (TLD). In both circuits 10, 12, the LED assemblies 20, 22, 24 are connected in series between the two outputs of the rectifier 14. A linear driver 16, in the examples of FIGS. 12 and 13 a controllable current source circuit, is connected in series with the LED assemblies 20, 22, 24 between the outputs of the rectifier 14. The controllable current source 16 is connected to a return path 31.

Electrical components/circuits, here referred to as control assemblies, are connected to the taps 26, 27, 28, 29 in the series connection, in particular to the interconnection points 26, 28 between the LED assemblies 20, 22, 24.

In the example of the circuit 10 shown in FIG. 12, which shows a single current source TLD circuit, the control assemblies are controllable switches 30, 32, 34, each connected in parallel to the LED assemblies 20, 22, 24. The switches 30, 32, 34 thus form bypass elements, by means of which the individual LED assemblies 20, 22, 24 may be bypassed if the switches 30, 32, 34 are in a conductive state, such that the corresponding LED assembly 20, 22, 24 is deactivated.

A control unit (not shown) controls the operation of the switches 30, 32, 34 depending on the momentary magnitude of the rectified sinusoidal mains voltage, such that in each case a suitable series connection of LED assemblies is connected to the output of the rectifier 14 such that a voltage mismatch between the momentary value of the rectified voltage and the sum of the forward voltages of the currently activated LED assemblies 20, 22, 24 is minimized.

In the example of the circuit 12 of FIG. 13, which shows a multiple current source TLD circuit, the control assemblies are controllable current sources 40, 42, in addition to the controllable current source 16. The controllable current sources 40, 42, 16 may each be controlled according to current measuring signals provided by current measuring resistors (shunts) provided in the return path 31.

In both different circuits 10, 12, the shown tapped linear driver configuration has fundamental limitations. In particular, the LED string voltage (sum of forward voltages of the LED assemblies 20, 22, 24 if activated) needs to be matched to the mains input voltage amplitude. Any excess voltage results in increased losses in the driver, in the shown example in the linear current source 16.

Figure 14:
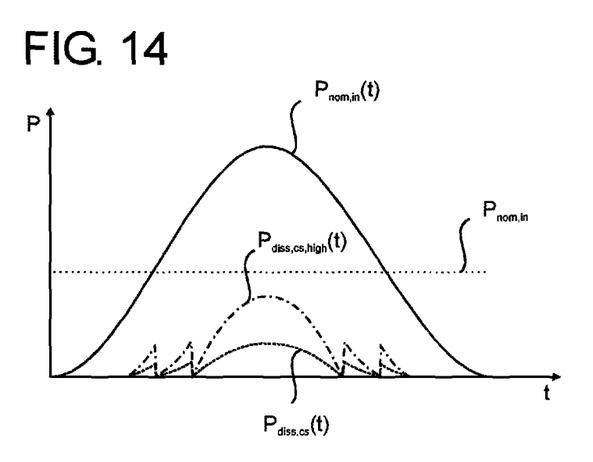
FIG. 14 shows a diagram of power over time for the circuit of FIG. 12.

FIG. 14 shows a diagram of power P shown over time t for a half period of the mains voltage. Shown as a dotted line is the average nominal input power $P_{nom,in}$. Shown as a solid line is the time-varying nominal input power $P_{nom,in}$ (t). If a nominal mains input voltage is applied, the average power dissipation in the linear driver 16 will be relatively low, as shown in the dashed line $P_{diss,cs}$ (t). However, if the mains voltage fluctuates and an increased voltage is applied (high mains), the total average dissipation of the TLD driver sharply increases, as shown in the dash-dotted line $P_{diss,cs,high}$ (t). For example, while the average total power dissipation at nominal mains may be 3.8 W, the total average dissipation at high mains (20% increased amplitude) may increase e.g. up to 9.4 W. Thus, the TLD concept regardless of whether the single current source circuit 10 of FIG. 12 or the multiple current source circuit 12 of FIG. 13 is regarded, does not react well to different operating conditions, such as in particular high mains.

Figure 1:
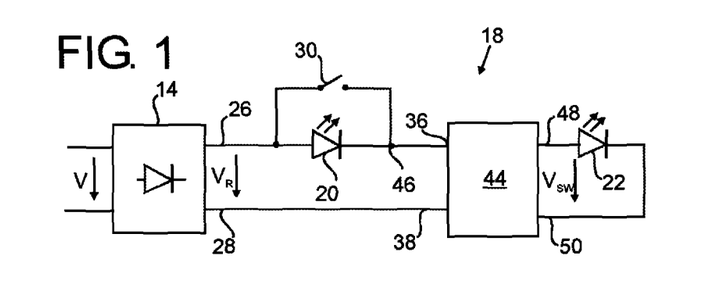
FIG. 1 shows a circuit diagram of a first embodiment of the invention.

FIG. 1 shows a circuit 18 according to a first embodiment. A rectifier 14 is connected to an alternating voltage V, in particular mains, to deliver a rectified voltage $V_R$ at rectifier outputs 26, 28.

A first LED assembly 20 is connected to the first rectifier output 26. (Each LED assembly may be e.g. a series connection or a parallel connection of individual LED elements). The LED assembly 20 is connected to one of the two inputs 36, 38 of a switching converter circuit 44 (SMPS). The first LED assembly 20 is thus connected—in the shown example directly connected, i.e. without further components in between—in a series connection between the output 26 of the rectifier 14 and the input 36 of the switching converter circuit 44. Thus, the first LED assembly 20 and the input 36 of the switching converter circuit 44 are electrically connected in series to the output 26 of the rectifier 14.

A switching element 30 is connected as a control assembly in parallel to the first LED assembly 20, i.e. connected on one side to the first output 26 of the rectifier 14 and on the other side to an interconnection tap 46 in the series connection. The switching element 30 is a controllable switching element which may be controlled by a control unit (not shown) to assume either a non-conducting state, where the LED assembly 20 is activated such that it may be operated by a current flowing from the output 26 of the rectifier 14, and a conducting state, where the switching element 30 closes a bypass path, thus deactivating the LED assembly 20.

The switching converter circuit 44 may be of any known type or topology, such as e.g. buck converter, boost converter, buck-boost converter, etc. It converts the voltage supplied at the inputs 36, 38 to an output voltage provided at outputs 48, 50 as generally known by the skilled person by continuous switching of a switching element connected to a reactive element (not shown in FIGS. 1-7). Examples of specific circuits for the switching converter circuit 44 will be further discussed in connection with FIGS. 8 and 10.

A second LED assembly 22 is connected to the outputs 48, 50 of the switching converter circuit 44. Thus, the switching converter circuit 44 supplies electrical power to the second LED assembly 22. If an input voltage is supplied to the inputs 36, 38 of the SMPS 44 at sufficient magnitude, an output voltage $V_{SW}$ is controlled at a predetermined level suited for operation of the second LED assembly 22.

A control unit (not shown) operates the switching element 30 in the same way as a switching element in a known TLD configuration, i.e. in dependence on the momentary available value of the rectified voltage $V_R$ or alternatively in dependence on the current through the first LED assembly 20 (or through the switch 30 if closed, i.e. the current from tap 26 to tap 36).

The magnitude of $V_R$ varies within each half cycle of the mains voltage V sinusoidally starting from zero. While the voltage $V_R$ is below a threshold, which may correspond to the forward voltage of the LED assembly 20 (which, as explained above, may e.g. be a series connection of individual LED elements), the switching element 30 is set to a conductive state, such that the LED assembly 20 is deactivated. Thus, in the initial time interval of the half period, as $V_R$ rises, a residual voltage between the input terminals 36, 38 of the switching converter circuit 44 also rises. The switching converter circuit 44 converts this input voltage to a switched output voltage $V_{SW}$ to drive the second LED assembly 22.

As the value of the rectified voltage $V_R$ increases to a value above the threshold, switching element 30 is controlled by the control unit to a non-conductive state, thereby activating the first LED assembly 20. Since the forward voltage of the LED assembly 20 remains constant, there will thereafter be an again increasing residual voltage between the inputs 36, 38 of the switching converter circuit 44 as the rectified voltage $V_R$ further increases. If the residual voltage is large enough to supply the switching converter circuit 44, power is supplied also to the second LED assembly 22.

In the second half of the half period, the value of the voltage $V_R$ steadily decreases. If $V_R$ falls to a value below the threshold, the switching element 30 is set to a conductive state. Again, any residual voltage during the switching steps is converted to the output voltage $V_{SW}$ by the switching converter circuit 44 to supply electrical power to the second LED assembly 22.

In the alternative embodiment effecting control of the switch 30 based on the current, the current value is measured. If the switch 30 is open (i.e. in the non-conducting state) and the LED assembly 20 is operating, the current is monitored. As a first current threshold value is reached, the switch 30 is closed (i.e. controlled to be set in the conducting state). With the switch 30 closed, the current is further monitored until a second current threshold value is reached, where the switch 30 is again opened.

Figure 2:
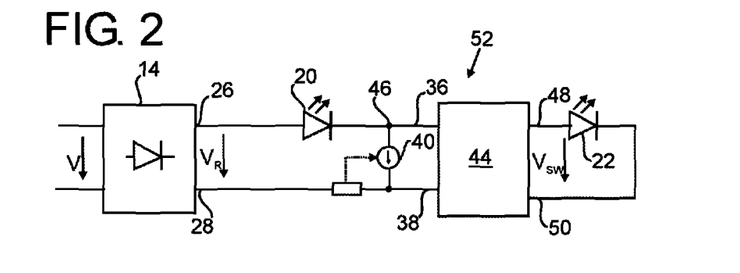
FIG. 2 shows a circuit diagram of a second embodiment of the invention.

The same basic concept as shown in FIG. 1 and described above in connection with the first embodiment 18 may also be realized by the circuit 52 as shown in FIG. 2 according to a second embodiment. Here, like reference numerals are used for like parts, and only differences will be further explained.

The circuit 52 according to the second embodiment differs from the circuit 18 according to the first embodiment by the type of control assembly for operation of the first LED assembly 20. Instead of a switching element 30 in the first embodiment, the circuit 52 according to the second embodiment includes a controllable current source 40 as a control assembly connected between the tap 46 in the series connection of the first LED assembly 20 and the input 36 of the switching converter circuit 44 and a return path to the second output 28 of the rectifier 14. Control of the controllable current source 40 is effected in the same way as in a comparable TLD circuit (as e.g. shown in FIG. 13 and described above), where the current source 40 is controlled according to the current value delivered by a sense resistor in the return path. The current source 16 from the prior art multiple current source TLD circuit (FIG. 13) is replaced by the SMPS 44.

Both the circuits according to the first and second embodiment realize the concept of a hybrid driver, including an architecture similar to a TLD driving concept, but including a switching converter (SMPS, switch mode power supply) within the series connection of the TLD structure. Compared to LED driver circuits relying entirely on SMPS, size and cost is significantly reduced because only a fraction, such as e.g. approximately 50% of the total output power requires power conversion in the SMPS. Further, the hybrid driver concept achieves a good utilization of the LED assemblies 20, 22 by driving both at a similar average current level. This helps to spread the heat better and also has the advantage of a more uniform optical light distribution. Underutilization of a part of the LED assemblies is avoided.

Compared to known TLD drivers, the hybrid driver is better suited to cope with high mains, without excess losses being dissipated in a linear driver. Thus, the efficiency is improved as the power losses are reduced by the conversion in the SMPS.

Figure 3:
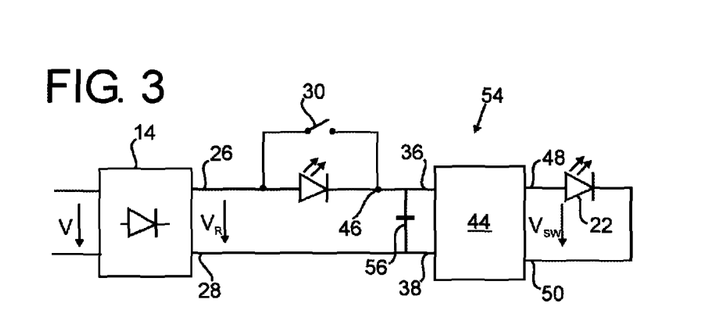
FIG. 3 shows a circuit diagram of a third embodiment of the invention.

FIG. 3 shows a circuit 54 according to a third embodiment. The circuit 54 according to the third embodiment as well as the further circuits in the other embodiments corresponds in some parts to the circuits 18, 52 according to the above described embodiments. In FIG. 3 and in the remaining figures, like reference numerals refer to like parts. In the following, only the differences between the individual embodiments will be further explained.

In the circuit 54 as shown in FIG. 3, a capacitor 56 is provided, connected between the inputs 36, 38 of the switching converter circuit 44. The capacitor 56 will be charged to the voltage remaining of the rectified voltage $V_R$ after deduction of the voltage drop over the first LED assembly 20. The capacitor 56 may serve to stabilize the voltage between the inputs 36, 38 of the switching converter circuit 44. Rather than dissipating the residual voltage in a linear driver, the voltage is used to power the second LED assembly 22 through the SMPS 44.

Figure 4:
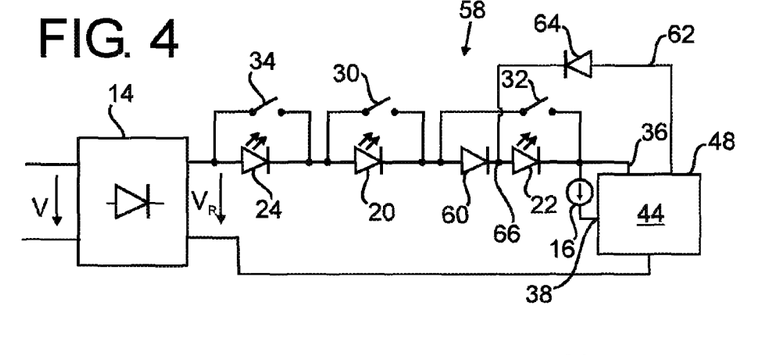
FIG. 4 shows a circuit diagram of a fourth embodiment of the invention.

FIG. 4 shows a circuit 58 according to a fourth embodiment. As compared to the circuit 18 according to the first embodiment, the circuit 58 shown in FIG. 4 comprises, besides the first and second LED assembly 20, 22 a third LED assembly 24. All three LED assemblies 20, 22, 24 are electrically connected in series (with an additional blocking diode 60 between the first LED assembly 20 and second LED assembly 22, which will be explained later). Switching elements 30, 34 are connected in parallel to the respective LED assemblies 20, 24. The switching element 32 is connected in parallel to the series connection of the LED assembly 22 and the blocking diode 60.

A linear current source 16 is electrically connected in series to the LED assemblies 20, 22, 24.

The circuit 58 shown in FIG. 4 is an example of an implementation of a single current source hybrid TLD driver. The first, second and third LED assemblies 20, 22, 24 are controlled by a control unit (now shown) by their respective switching elements 30, 32, 34. Control is effected as known for conventional TLD, i.e. according to a first and second threshold of the rectified voltage $V_R$. Depending on whether the rectified voltage $V_R$ is below the first threshold, between the first and second threshold, or above the second threshold, either none, only the first, the first and the second, or the first, second and third LED assembly 20, 22, 24 are activated by corresponding control of the switches 30, 32, 34.

Excess voltage remaining will be converted by the efficient SMPS 44 and delivered back from an output 48 thereof through a feedback branch 62 with a blocking diode 64 to a tap 66 in the series connection. Thus, the second LED assembly 22 receives electrical power from the SMPS 44. Blocking diodes 60, 64 prevent a reverse current flow.

In the circuit 58 according to FIG. 4, the feedback line 62 connects the output 48 of the SMPS back to the input 36 thereof, with the second LED assembly 22 connected in between. Thus, in order to provide electrical power to the second LED assembly 22, the output voltage of the SMPS 44 should be higher than the input voltage. For this reason, a buck-boost converter type of SMPS 44 is preferred in this embodiment.

In instants within each half cycle where the currently activated series connection of LED assemblies 20, 22, 24 is closely matched to the momentarily available rectified voltage $V_R$, there will be no significant residual voltage, such that the SMPS 44 may not be active. However, in between the steps of the TLD control, as the residual voltage increases, the SMPS will convert the residual voltage back to supply the second LED assembly 22 with electrical power, thus increasing efficiency.

If a high mains voltage V is applied and a large mismatch exists, the SMPS 44 will be particularly effective to prevent losses.

Figure 5:
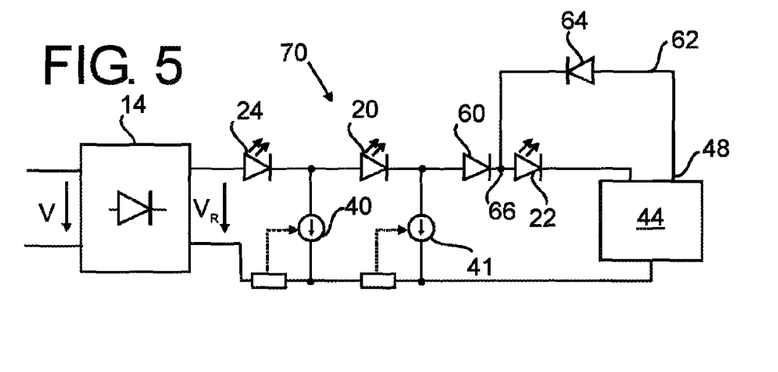
FIG. 5 shows a circuit diagram of a fifth embodiment of the invention.

FIG. 5 shows a circuit 70 according to a fifth embodiment. The circuit 70 shows an example of an implementation of a multi current source hybrid TLD. As in the circuit 58 according to the fourth embodiment, the output 48 of the SMPS 44 is fed back through a feedback line 62 to provide electrical power to the second LED assembly 22. In the circuit 70 shown in FIG. 5, control is effected through controllable current sources 40, 41 acting as control assemblies for the LED assemblies 20, 24.

The total current through the circuit 70 is measured by the current sense resistor of the current source 40. At the start of each half cycle, the current source 40 will be set to a low current value. After the mains zero crossing, no current will flow until the rectified mains voltage $V_R$ is equal to the forward voltage of the LED assembly 24.

Thereafter, the current through the LED assembly 24 will continue to increase with increasing $V_R$. As the voltage $V_R$ reaches a value equal to the sum of forward voltages of LED assemblies 24 and 20, the current source 41 will start to conduct.

Since the current of the current source 41 flows through the current sense resistor of the current source 40 also, the current through the current source 40 will be reduced by the same amount as current is supplied by the current source 41. Thus, the current through the LED assembly 24 will not change as the current source 41 takes over.

Within a short period of time, the current source 41 will take over the current and current source 40 will be deactivated.

Near the maximum momentary voltage of the rectified mains voltage $V_R$, the SMPS 44 acting as a current source will take over the entire current through the LED assemblies 20, 22, 24 in the same way, i.e. due to the total current flowing in the return path the sense resistors will provide a high current measuring signal such that current sources 40, 41 will be deactivated.

Figure 6:
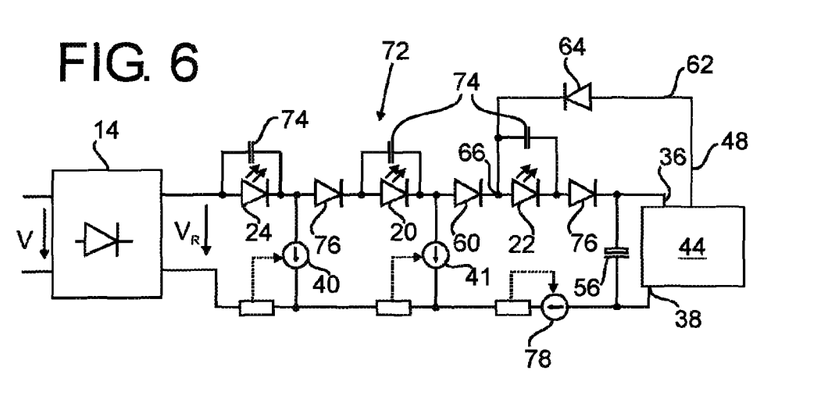
FIG. 6 shows a circuit diagram of a sixth embodiment of the invention.

FIG. 6 shows a circuit 72 according to a sixth embodiment. The circuit 72 corresponds in structure to the circuit 70 of FIG. 5. In the circuit 72, control is effected, as in the circuit 70 of FIG. 5, by controllable current sources 40, 41 and 78. In the following, only differences will be further explained.

In the circuit 72, stabilizing capacitors 74 are connected in parallel to each of the LED assemblies 20, 22, 24. The stabilizing capacitors 74 serve to stabilize the light output of the LED assemblies 20, 22, 24 and reduce flicker. During operation of the LED assemblies 20, 22, 24 the stabilizing capacitors 74 are charged to the forward voltage of each LED assembly 20, 22, 24. In case of minor voltage or current fluctuations, operation of the LED assemblies 20, 22, 24 is thereby stabilized.

Further, the circuit 72 comprises a relatively large capacitor 56 as residual voltage capacitor. The residual voltage capacitor 56 is an electrolytic capacitor connected in parallel to the input of the SMPS 44, i.e. between the input terminals 36, 38 thereof.

Further, the circuit 72 comprises a third controllable current source 78 connected in the return path, electrically in series with the input 36, 38 of the SMPS 44.

Blocking diodes 76 are connected within the series connection of the LED assemblies 20, 22, 24 to prevent a reverse current flow.

The circuit 72 including the series connected current source 78 and the large residual voltage capacitor 76 is an average power hybrid converter, i.e. a circuit of the presently proposed hybrid TLD-SMPS structure which is designed to achieve the largest savings in terms of a small SMPS, while sufficiently reducing power dissipation at high mains voltage. The average power hybrid converter comprises the series fill-in capacitor 56 which will charge to the level of the average excess voltage during high mains. Assuming that mains amplitude fluctuations do not occur in only one (half) cycle but generally last for a number of cycles of the mains voltage, the residual voltage to which the capacitor 56 is charged will be substantially constant over a number of cycles, i.e. the variations within each (half) cycle will be small compared to the total value. For this reason, the capacitor 56 in this circuit may be considered a residual voltage capacitor.

Control of the circuit 72 is effected to achieve a substantially constant voltage over the residual voltage capacitor 56. This may be achieved e.g. if the controllable current source 78 provides a feedback signal to the control of SMPS 44, allowing the SMPS 44 to control an average voltage level across the residual voltage capacitor. Alternatively, the controllable linear current source may be provided in parallel to the residual voltage capacitor 56 (e.g. as shown for the current source 16 in FIG. 7, which will be further explained below). The SMPS 44 then may directly measure the voltage drop and current through the linear current source and thus control the voltage across the residual voltage capacitor 56 accordingly.

At low mains voltage, the voltage across this capacitor will be very low, usually near zero. At high mains voltage, the voltage across the capacitor 56 will be high equal to the residual voltage, i.e. the difference between the high amplitude of the mains voltage and the nominal amplitude of the mains voltage. Charging of the capacitor is controlled by the TLD driver control unit (not shown), as the capacitor 56 is placed in series with the LED assemblies 20, 22, 24, and discharging of the residual voltage capacitor 56 is controlled by the SMPS converter 44.

The main advantage of the average power hybrid converter circuit 72 is that it is intended to achieve the goal of reducing power dissipation at high mains voltage while requiring only a relatively small size SMPS 44. As discussed above with respect to FIG. 14, the peak power during high mains can be relatively high, such as e.g. 10-20 W. The average power hybrid converter circuit 72 shown in FIG. 6 uses a relatively high capacitance 56 in order to convert a continuous average power back into the last stage of LEDs, namely to the second LED assembly 22. For this reason, the SMPS converter 44 need only be designed for less than half of the peak dissipation power. Since the capacitance 56 is relatively large, it will have an almost constant voltage across it, such that the potential of the input terminal 36 can be controlled in order to adjust towards high mains conditions. During normal and high mains operation, the dissipation of the TLD driver including the controllable current sources 40, 41, 78 will be almost similar. Thus, the average power hybrid TLD driver circuit 72 is the least cost solution for still obtaining good efficiency during high mains.

Figure 7:
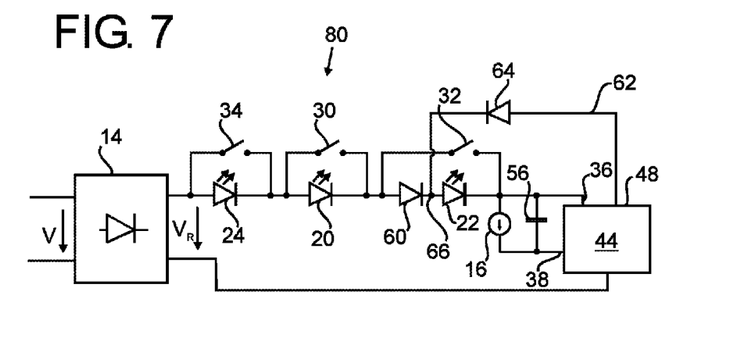
FIG. 7 shows a circuit diagram of a seventh embodiment of the invention.

FIG. 7 shows a circuit 80 according to a seventh embodiment. The structure of the circuit 80 is that of a single current source hybrid TLD converter with three LED assemblies 20, 22, 24 and associated bypass switches 30, 32, 34 connected in parallel. As in the circuit 58 according to the fourth embodiment (FIG. 4), a current source 16 is connected in series with the LED assemblies 20, 22, 24, between the first and second input 36, 38 of the SMPS 44. The output voltage delivered at the output 48 of the SMPS 44 is fed back through a feedback line 62 into the tap 66 of the series connection to deliver electrical operating power to the second LED assembly 22, with blocking diodes 60, 64 preventing reverse current flow.

In the circuit 80 as shown in FIG. 7, a capacitor 56 is connected between the input 36, 38 of the SMPS 44, in parallel to the controllable current source 16.

The circuit 80 according to the seventh embodiment could be designated a peak power hybrid TLD converter. In comparison with the average power hybrid TLD converter circuit 72 (FIG. 6), the peak power hybrid TLD converter 80 requires a higher power SMPS converter 44, but achieves improved efficiency at nominal operating conditions. For a peak power hybrid TLD converter, in particular the shown structure of the circuit 80 with a single current source 16 in series and switching elements 30, 32, 34 in parallel to the LED assemblies 20, 22, 24 is preferred. The peak power hybrid TLD converter circuit may be optimized either for constant output power or for lowest cost implementation at high mains compatibility. At high mains, if the output power needs to be respected, the input current of the hybrid TLD driver needs to be lowered with respect to the higher mains voltage. As a consequence, the peak power of the SMPS 44 doubles. However, this peak power of the SMPS 44 may correspond to only 30% of the total peak power that is delivered to the LED assemblies 20, 22, 24 under nominal conditions, such that the efficiency may still be increased by feeding this power back through the feedback line 62 to the second LED assembly 22.

Figure 9A:
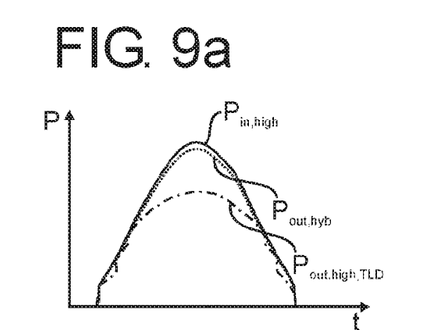
FIGS. 9*a*, 9*b* show diagrams of power over time in the circuit according to the eighth and ninth embodiment of the invention.

FIG. 9a shows a comparison of the output power as a function of time within a half cycle of the mains voltage between a conventional TLD driver ($P_{out,high,TLD}$, dash-dotted line), hybrid TLD driver with peak power converter ($P_{out,hyb}$, dotted line), and a total input power ($P_{in,high}$, solid line).

In order to optimize the peak power hybrid TLD driver circuit 80 for component cost, the SMPS 44 is designed as small as possible. Thus, the design of the peak power hybrid TLD driver circuit 80 may be optimized for nominal mains, and the output power during high mains may be limited in order to fulfil the power limitations of the SMPS 44.

Figure 9B:
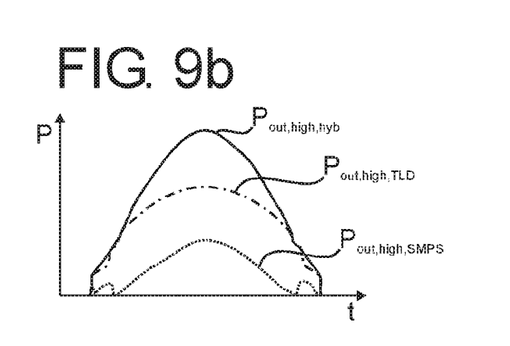

As an example, FIG. 9b shows a graph of power P over time t for a half cycle of the mains voltage V. Shown as a solid line is the total output power of the hybrid circuit 80 $P_{out,high,hyp}$. The output power of the SMPS converter $P_{out,high,SMPS}$ is shown as a dotted line. The output power of the TLD part of the circuit 80 $P_{out,high,TLD}$ is shown as a dashed-dotted line.

As shown in FIG. 9b, the total output power may drop by as much as 40% during high mains compared to nominal mains condition if the peak power of the hybrid TLD driver is optimized for component cost for operating under nominal mains voltage.

Figure 8:
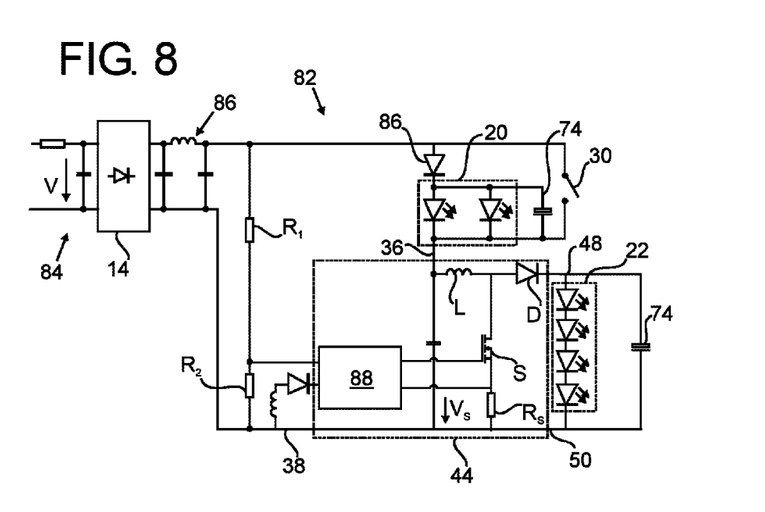
FIG. 8 shows a circuit diagram of the eighth embodiment of the invention corresponding to the second embodiment of the invention.

FIG. 8 shows a circuit 82 as a more detailed example of the circuit 18 shown in FIG. 1.

In the circuit 82, the input mains voltage V is filtered in an input filter circuit 84, rectified in a rectifier 14 and again filtered in a further filter circuit 86. The resulting rectified and filtered voltage is applied to a series connection of the first LED assembly 20 and the SMPS 44.

In the example of FIG. 8, the first LED assembly 20 is comprised of a parallel connection of two individual LED elements. A stabilizing capacitor 74 is connected in parallel to the first LED assembly 20. A switching element 30 is connected in parallel to the first LED assembly 20 to provide a controllable bypass. A blocking diode 86 is connected in series to the first LED assembly 20 in order to prevent reverse current flow from the stabilizing capacitor 74.

The SMPS 44 comprises an inductance L, an output diode D and a MOSFET as switching element S arranged in the known topology of a boost converter. A control circuit 88 serves to control the switching element S based on a feedback signal of a sense voltage $V_S$ over a sense resistor $R_S$. The control circuit 88 of the SMPS 44 receives a voltage signal from the voltage divider $R_1$, $R_2$, representing the magnitude of the rectified and filtered input voltage.

The boost converter 44 provides an output voltage at the output terminals 48, 50 which is used to operate the second LED assembly 22, stabilized by a parallel stabilizing capacitor 74. In the example shown, the second LED assembly 22 is a series connection of four individual LED elements.

Figure 10:
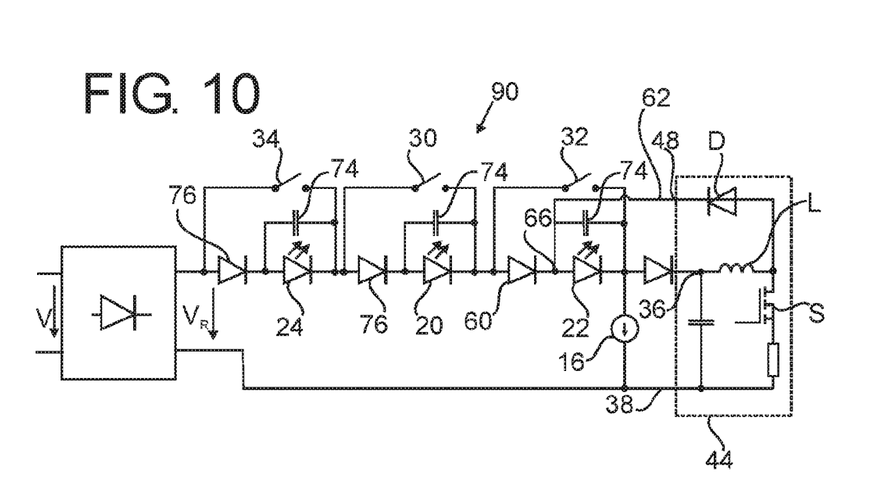
FIG. 10 shows a circuit diagram of a ninth embodiment of the invention.

FIG. 10 shows a circuit diagram of a circuit 90 according to a ninth embodiment. The circuit 90 is a more detailed example, corresponding to the structure of the circuit 58 according to the fourth embodiment.

In addition to the circuit 58, stabilizing capacitors 74 are connected in parallel to each of the LED assemblies 20, 22, 24, with blocking diodes 76 in series to prevent reverse current flow.

As shown in FIG. 10, the SMPS 44 in the circuit 90 is a buck-boost converter, including an inductance L, a MOSFET as switching element S and an output diode D.

A control circuit (now shown) of the SMPS 44 is provided for control of the switching element S to provide an output voltage at the output terminal 48 that is fed back via feedback line 62 into the tap 66 within the series connection of the LED assemblies 20, 22, 24.

Figure 11:
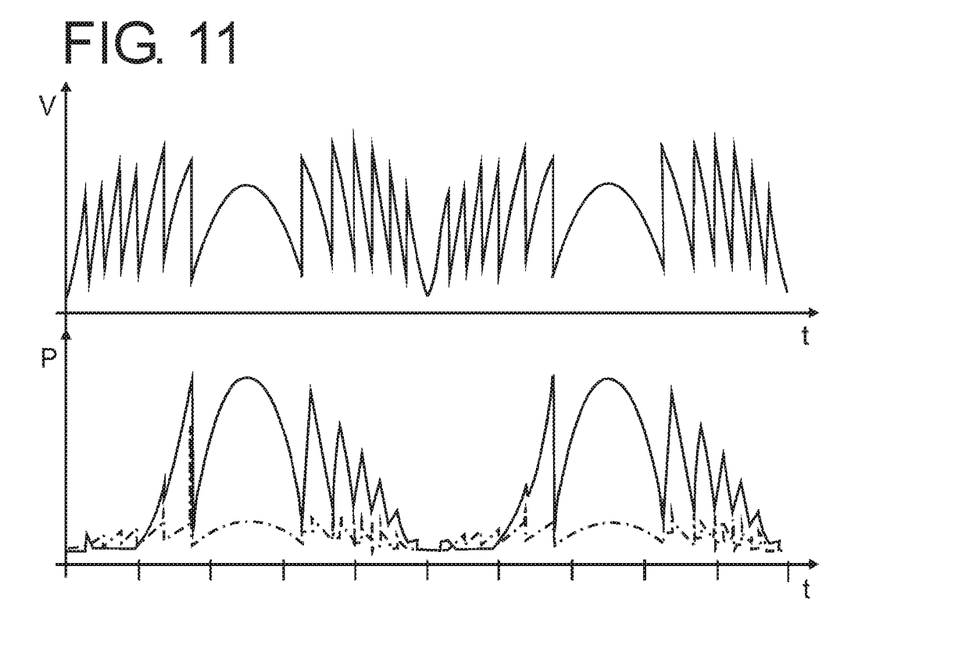
FIG. 11 shows a diagram showing the power over time for the ninth embodiment of the invention.

FIG. 11 shows in its upper portion the voltage drop V over the linear current source 16 of the circuit 90.

In the lower part, power P is shown over time t. Without the SMPS 44, the curve shown as a solid line would correspond to the losses in the linear current source 16. Due to the extraction of power by the SMPS 44, the actually occurring losses are significantly lower, shown as a dash-dotted line.

This shows how, using the buck-boost converter 44 shown in FIG. 10, losses in the linear current source 16 can be significantly reduced and the resulting power fed back to the second LED assembly 22. This leads to significantly improved efficiency of the circuit 90 and improved usage of the LEDs. In a conventional TLD structure, the second LED assembly 22 would have the least operating time within each half period. By use of the output voltage from the SMPS 44, the operation time of the second LED assembly 22 is increased, leading to improved distribution of both light output and thermal losses among the LED assemblies 20, 22, 24.

While the invention has been illustrated and described in detail in the drawings and the foregoing description, such illustration and description are to be considered illustrative or exemplary and not restrictive; the invention is not limited to the enclosed embodiments.

For example the individual elements shown in different configurations in the above embodiments, such as a single current source structure or multiple current source structure, switching elements 30, 32, 34 in parallel to LED assemblies, stabilizing capacitors 74 electrically arranged in parallel to the LED assemblies 20, 22, 24, residual voltage capacitor 56, feedback line 62 etc. may be differently combined. The SMPS 44 may be realized in different topologies of switching converter circuits, such as beside the shown boost and buck-boost converter alternatively also as a buck converter, sepic converter or other type.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the claim.

The invention claimed is:

1. Lighting circuit, comprising:
    a rectifier with an input for an alternating voltage, wherein said rectifier outputs a rectified voltage; and
    at least a first and a second LED assembly connected to be supplied with electrical power from said rectifier,
    wherein said first LED assembly is electrically connected in series with a first output of said rectifier, said first LED assembly being further electrically connected in series with an input of a switching converter circuit, and said second LED assembly is electrically connected to an output of said switching converter circuit, and
    wherein a control assembly for controlling operation of said first LED assembly is connected to a tap in said series connection, the control assembly comprising a switching element controllable at least in a conducting and non-conducting state, said switching element being connected to bypass said first LED assembly in said conducting state,
    wherein said switching element is operated in a nonconductive state when said rectified voltage exceeds a first threshold, thereby activating said first LED assembly,
    wherein, when said rectified voltage exceeds said first threshold, a residual voltage is input to said switching converter circuit, and
    wherein, when said residual voltage exceeds a second threshold, an output voltage of said switching converter circuit activates said second LED assembly.

2. Lighting circuit according to claim 1, wherein
    said switching converter circuit comprises at least a reactive element, a controllable switching element and a control circuit for controlling said controllable switching element to repeatedly alternate between a conducting and a non-conducting state.

3. Lighting circuit according to claim 1, wherein
at least a third LED assembly is electrically connected in said series connection between said first output of said rectifier and said input of said switching converter,
and wherein a control assembly for controlling operation of said third LED assembly is connected to a tap in said series connection.

4. Lighting circuit according to claim 1, wherein
said switching converter circuit comprises at least two input terminals,
wherein a capacitor is connected between said two input terminals.

5. Lighting circuit according to claim 4, wherein
said capacitor is electrically connected in series at least to said first LED assembly.

6. Lighting circuit according to claim 1, wherein
at least one of said LED assemblies comprises multiple LED elements electrically connected in series, in parallel, or in a series/parallel connection.

7. Lighting circuit according to claim 1, wherein
a stabilizing capacitor is electrically connected in parallel with at least one of said LED assemblies.

8. Lighting circuit according to claim 1, wherein
said second LED assembly is electrically connected in series with said first LED assembly.

9. Lighting circuit according to claim 1, wherein
said second LED assembly is electrically connected between said first LED assembly and an input of said switching converter circuit.

10. Lighting circuit according to claim 1, wherein
a current source is electrically connected in series to said first LED assembly.

11. Method of operating a lighting circuit, comprising:
supplying a rectifier with an alternating voltage to supply electrical power from said rectifier to at least a first and a second LED assembly, wherein said rectifier outputs a rectified voltage,
wherein said first LED assembly is electrically connected in series with a first output of said rectifier, said first LED assembly being electrically connected in series with an input of a switching converter circuit,
wherein said second LED assembly is electrically connected to an output of said switching converter circuit,
wherein a control assembly for controlling operation of said first LED assembly is connected to a tap in said series connection, the control assembly comprising a switching element controllable at least in a conducting and non-conducting state, said switching element being connected to bypass said first LED assembly in said conducting state,
wherein said switching element is operated in a nonconductive state when said rectified voltage exceeds a first threshold, thereby activating said first LED assembly,
wherein, when said rectified voltage exceeds said first threshold, a residual voltage is input to said switching converter circuit, and
wherein, when said residual voltage exceeds a second threshold, an output voltage of said switching converter circuit activates said second LED assembly.

* * * * *